(12) United States Patent
Ephraim

(10) Patent No.: US 9,205,879 B2
(45) Date of Patent: Dec. 8, 2015

(54) STAND UP SIT DOWN (SUSD) VEHICLE'S

(71) Applicant: Hasani Nnamdi Ephraim, Camden, AL (US)

(72) Inventor: Hasani Nnamdi Ephraim, Camden, AL (US)

(\*) Notice: Subject to any disclaimer, the term of this patent is extended or adjusted under 35 U.S.C. 154(b) by 0 days.

(21) Appl. No.: 14/120,017

(22) Filed: Apr. 15, 2014

(65) Prior Publication Data

US 2015/0307141 A1    Oct. 29, 2015

(51) Int. Cl.
*B62D 33/073* (2006.01)

(52) U.S. Cl.
CPC ................................. *B62D 33/073* (2013.01)

(58) Field of Classification Search
CPC ..................................................... B62D 33/073
See application file for complete search history.

(56) References Cited

U.S. PATENT DOCUMENTS

| | | | |
|---|---|---|---|
| 4,392,546 A * | 7/1983 | Brown et al. | 180/326 |
| 5,951,098 A * | 9/1999 | Waldeck et al. | 296/190.11 |
| 6,182,525 B1 * | 2/2001 | Bowers et al. | 74/512 |
| 6,189,964 B1 * | 2/2001 | Henshaw et al. | 297/112 |
| 6,918,316 B2 * | 7/2005 | Johansson et al. | 74/512 |
| 7,047,716 B2 * | 5/2006 | Lang | 56/16.7 |
| 7,740,259 B2 * | 6/2010 | Kraimer et al. | 280/166 |
| 7,891,457 B2 * | 2/2011 | Holland et al. | 180/273 |
| 2006/0087154 A1 * | 4/2006 | Schlafer et al. | 296/190.01 |
| 2010/0187857 A1 * | 7/2010 | Fischer et al. | 296/184.1 |
| 2012/0049486 A1 * | 3/2012 | Lee | 280/656 |
| 2012/0112035 A1 * | 5/2012 | Volke et al. | 248/571 |
| 2013/0220168 A1 * | 8/2013 | Volke et al. | 105/342 |

\* cited by examiner

*Primary Examiner* — Paul N Dickson
*Assistant Examiner* — Darlene P Condra
(74) *Attorney, Agent, or Firm* — Barry Choobin; Patent 360

(57) ABSTRACT

This improved tractor truck provides relief during driving for extended periods of time, it consists primarily of an adjustable seat, two sets of gas and brake pedals, a truck floor, an adjustable floor pan, double doors a plurality of guide pipes and air cylinders. The adjustable seat has a seat body, an adjustable seat cushion that allows the driver to sit, stand or squat, adjustable arm rests and headrest, the truck seat being adjustable horizontally and vertically. The truck floor houses the first set of pedals which can be used while the driver is in a sitting position. The adjustable floor pan houses the second set of pedals and allows the adjustable floor pan to be adjusted upward or downward. The double door assembly allows the driver to easily and conveniently open and close the door if the driver is in the sitting or standing position.

9 Claims, 19 Drawing Sheets

STAND UP SIT DOWN (SUSD) VEHICLE'S

This application claims priority of U.S. Provisional Application Ser. No. 61/811,991 filed Apr. 15, 2013, the entire contents of which is incorporated herein by reference thereto.

BACKGROUND OF THE INVENTION

The present invention relates to an operating area for a tractor truck (hereinafter truck). More particularly, the present invention pertains to a truck that enables a driver to operate the vehicle in a sitting, standing or squatting position.

A truck driver is an individual who earns a living as the operator of a commercial truck. Truck drivers provide necessary services to society by transporting goods and materials to and from manufacturing plants, retail stores and distribution centers. This often requires driving for extended periods of time. Current regulations allow a truck driver to drive for eleven hours per day with a ten-hour break thereafter. The Maximum amount of time a driver can operate a vehicle is seventy hours in an eight-day period.

Conventional trucks require a driver to sit while operating the vehicle. The extended sitting time makes truck drivers more susceptible to health problems compared to the average person. Truck drivers are more prone to developing obesity, sleep apnea, high blood pressure and chronic conditions like heart disease and diabetes. Additionally, the extended period of time in which a truck driver sits in his or her truck while driving makes it difficult to maintain a regular exercise routine.

The present invention helps to overcome the problems associated with operating a truck for extended periods of time with a new and improved truck that enables a driver to sit, stand or squat while driving. The present invention features a new and improved truck operating area consisting of an adjustable seat, an adjustable floor plan, a truck floor, a first set of gas and brake pedals, a second set of gas and brake pedals and a double door assembly.

The driver's seat can be adjusted while sitting, standing or squatting. Various types of truck seats are situated above the front axle and engine of a truck. This can be uncomfortable for traveling for any length of time. In addition, standing naturally promotes better posture and allows the body to make natural movements while taking pressure off the back and joints. This would allow the driver to feel more alert and vibrant while operating the truck.

The seat cushion is adjustable and can be fixed into three positions. These include the conventional horizontal position, a tilted position and a downward position. Once the seat is adjusted to the tilted position, the driver can squat while operating the truck. The seat can be pushed further back to a downward position thereby allowing the driver to stand while driving.

The seat further includes an adjustable headrest and armrests for added comfort. The headrest and armrests can be adjusted to the desired angle or height to provide support while driving. The adjustable floor pan and pedals adjust to enable operation of the vehicle in a standing position. Instead of the conventional floor pan height, the adjustable floor pan of the present invention includes an adjustable feature to accommodate users of all sizes.

To further accommodate a truck operator, this invention features a double door assembly. It comprises a top door and a bottom door being suspended from a plurality of single-axis hinges. It is adequately dimensioned and configured to close the door frame opening of the truck and to allow the driver to enter and exit truck in a sitting, standing or squatting position.

BRIEF SUMMARY OF THE INVENTION

In view of the foregoing disadvantages associated with extended driving in a sitting position, the improved truck operator area of the present invention provides an improved system for sitting, squatting or standing while driving. As such, the general purpose of the present invention is to provide a new and improved truck operator area with an adjustable seat, a removable truck floor, an adjustable floor pan and two sets of gas and brake pedals. Another objective of the present invention is to provide a truck with a double door assembly that is easily opened by the driver.

In accordance with the present invention, there is provided a truck operator control area and truck seat assembly suited for driving at extended periods of time in a sitting, standing position or squatting position. The truck operator control area comprises an adjustable floor pan, a truck floor, a first set of gas and brake pedals, a second set of gas and brake pedals and double doors.

The seat is adjustable backwards into a standing position and forwards into a sitting position. The seat cushion features a top portion for sitting and an adjustable portion which allows the driver to sit upright or squat while driving. The front portion of the seat cushion can be tilted up or down and is supported by a lever mechanism to raise or lower the front portion. An adjustable headrest is mounted to the top portion of the truck seat and can be electrically and mechanically coupled to the truck seat. The left side and right side armrests can be mounted to the left and right sides of the car seat by guide pipes that extend from the sides of the truck seat. The armrests can be adjusted to various angles.

The adjustable floor pan houses the second set of gas and brake pedals. These are used when the driver is in the standing position. It comprises a shock absorption system to prevent the heels of the vehicle operator from absorbing the shocks. The adjustable floor pan has a selective upward and downward adjustment while the vehicle operator is in the standing position and to allow selective placement of said adjustable floor pan by said vehicle operator.

The truck floor is contiguous with the adjustable floor pan and is built at the same horizontal level as the adjustable floor pan. It houses the first set of gas and brake pedals when the driver is in a sitting or squatting position. The truck floor can be folded away when driver assumes the standing position and uses the second set of gas and brake pedals.

This invention also features a double door assembly comprising a top door and a bottom door being suspended from a plurality of single-axis hinges. The double door assembly is adapted to close the door frame opening of the truck and to allow the driver to enter and exit the truck in a sitting, standing or squatting position.

Henceforth, a truck cabin that allows the driver of the truck to sit, stand or squat while driving would fulfill a need in the auto customizing industry. This invention utilizes and combines known technologies in a new configuration in order to overcome a long felt need in the art.

Additional advantages of the invention will become apparent from the following detailed description taken in conjunction with the accompanying drawings.

DETAILED DESCRIPTION OF THE INVENTION

Figure 1:
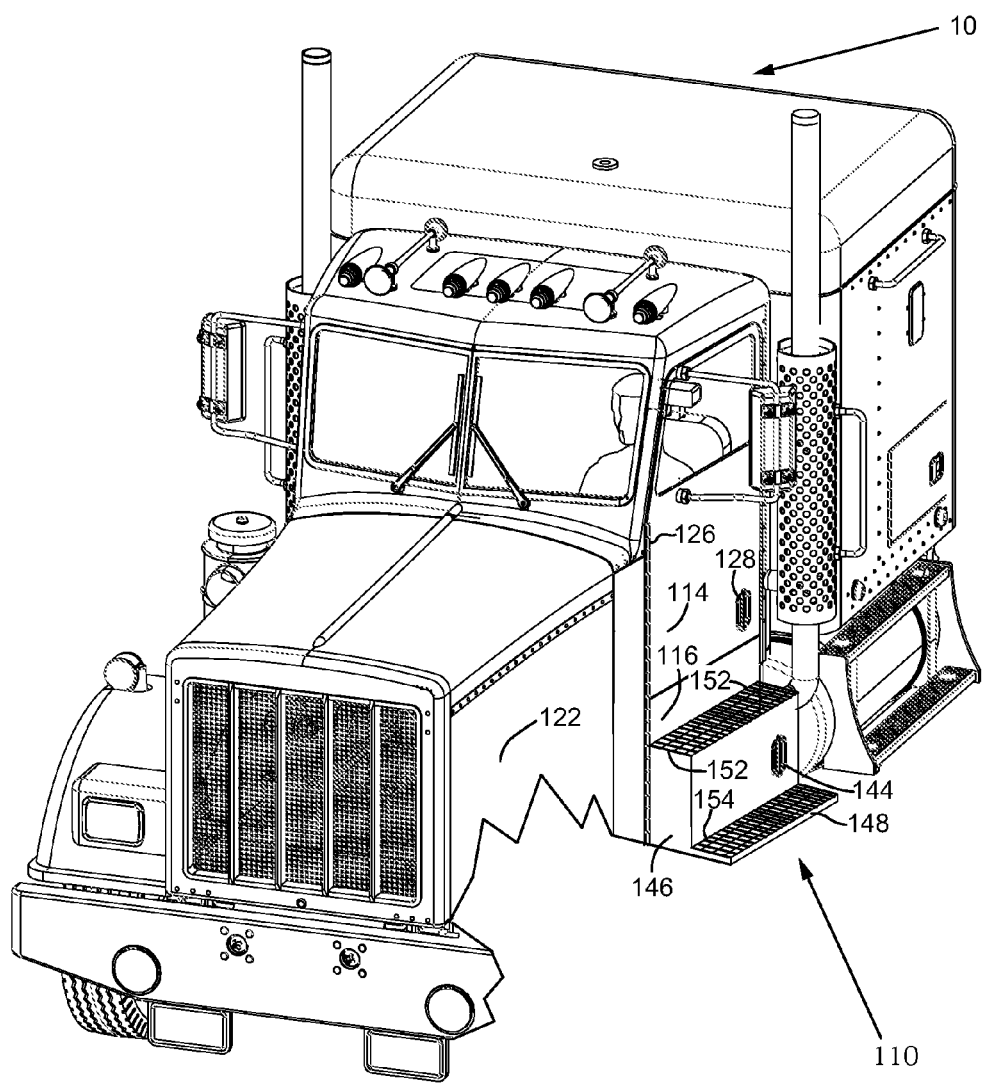
FIG. 1 is perspective view showing a driver in the truck operator area and the double doors of the present invention.

The present invention derives from the recognition that sitting, standing or squatting while driving is an advantageous feature of a truck in order to provide relief to truck drivers who drive for many hours. By providing and employing a truck with an adjustable floor pan and adjustable seat, the driver can drive comfortably for many hours compared to sitting for hours without relief.

The invention employs an adjustable seat 20 which enables the driver to sit, stand or squat while driving. The driver can adjust the position of the adjustable seat 20 in a vertical or horizontal position. By pushing the adjustable seat 20 backwards to a standing position, the driver can adjust the adjustable floor pan 60. In the standing position, the driver can adjust the adjustable seat 20 in a horizontal and vertical position. The driver can also open the double door assembly 110 by unlocking a top door latch 128 and a bottom door latch 144 depending on whether the driver is sitting or standing.

Figure 2:
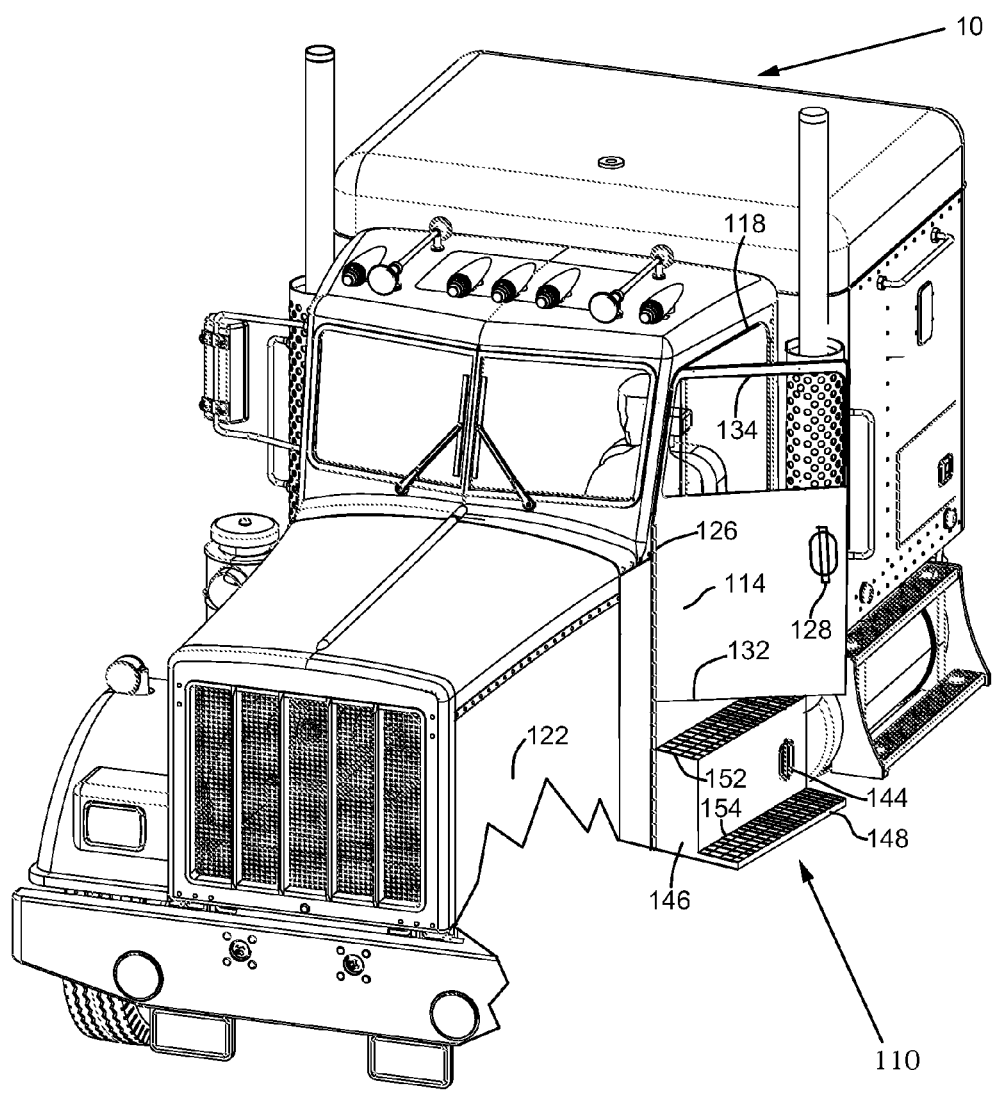
FIG. 2 is a perspective view showing a driver sitting in the truck operator area and the top door of the double door assembly being in the opened position.
Figure 3:
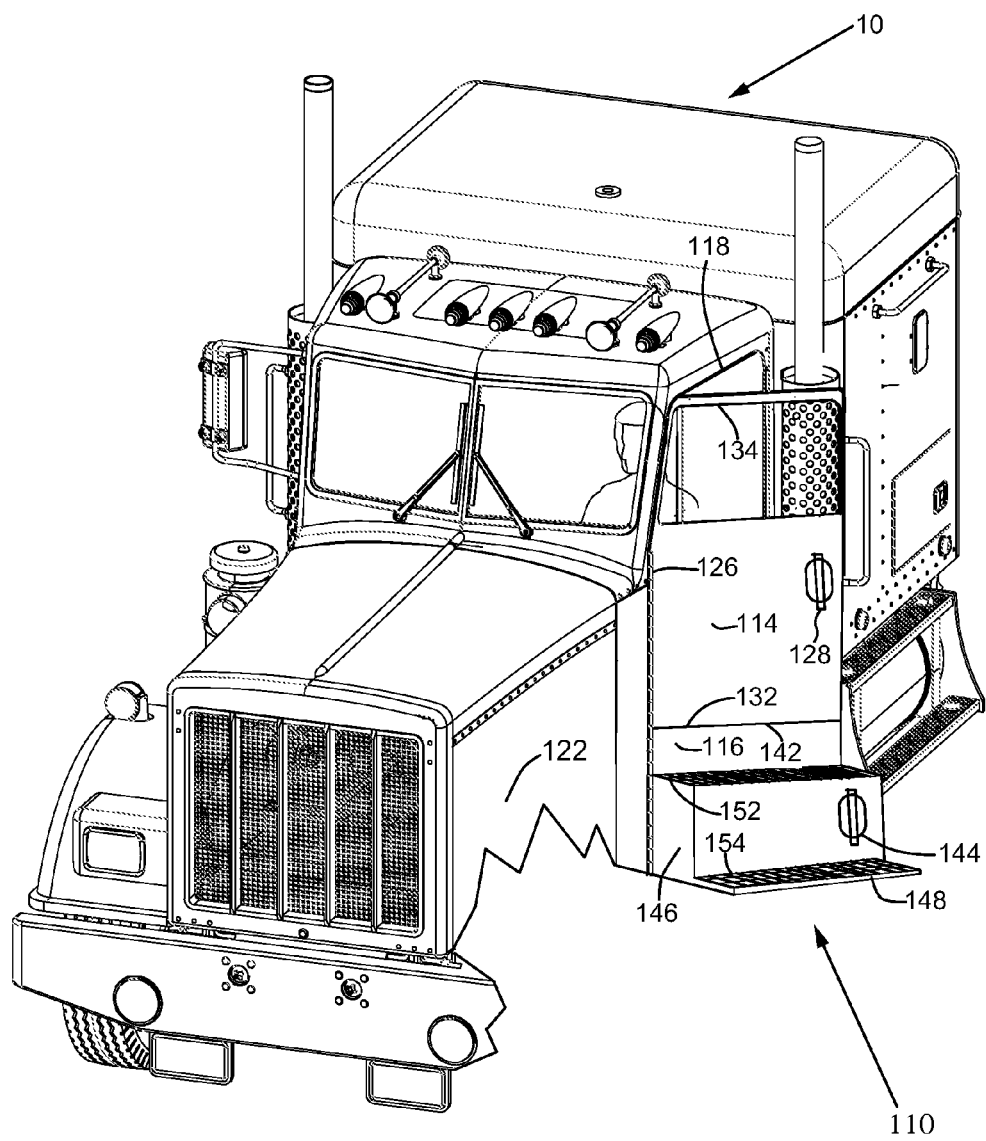
FIG. 3 is perspective view showing a driver in the truck operator area and the top and bottom doors of the double door assembly being in the opened position.
Figure 4:
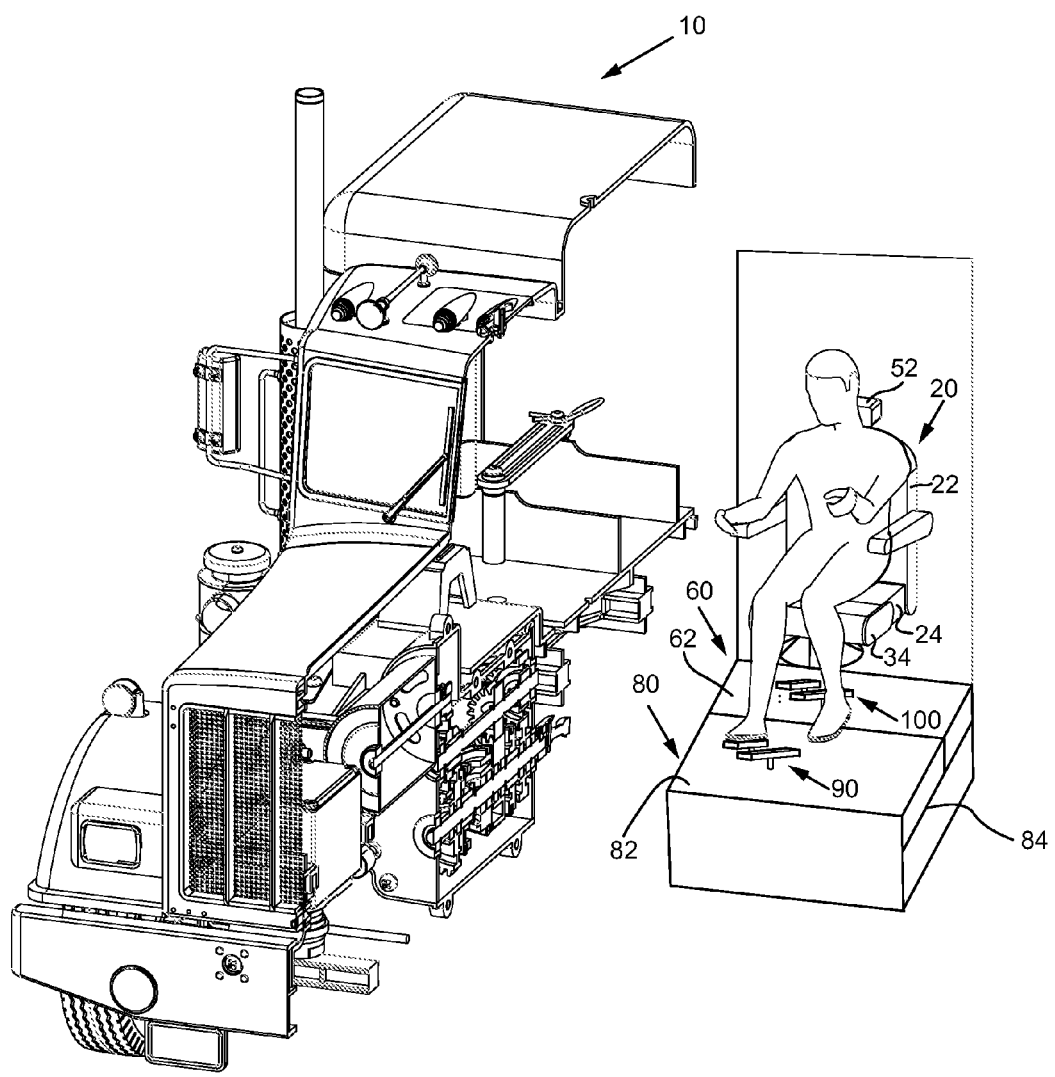
FIG. 4 is cut away view showing a driver sitting in the truck operator and using the first set of gas and break pedals.
Figure 5:
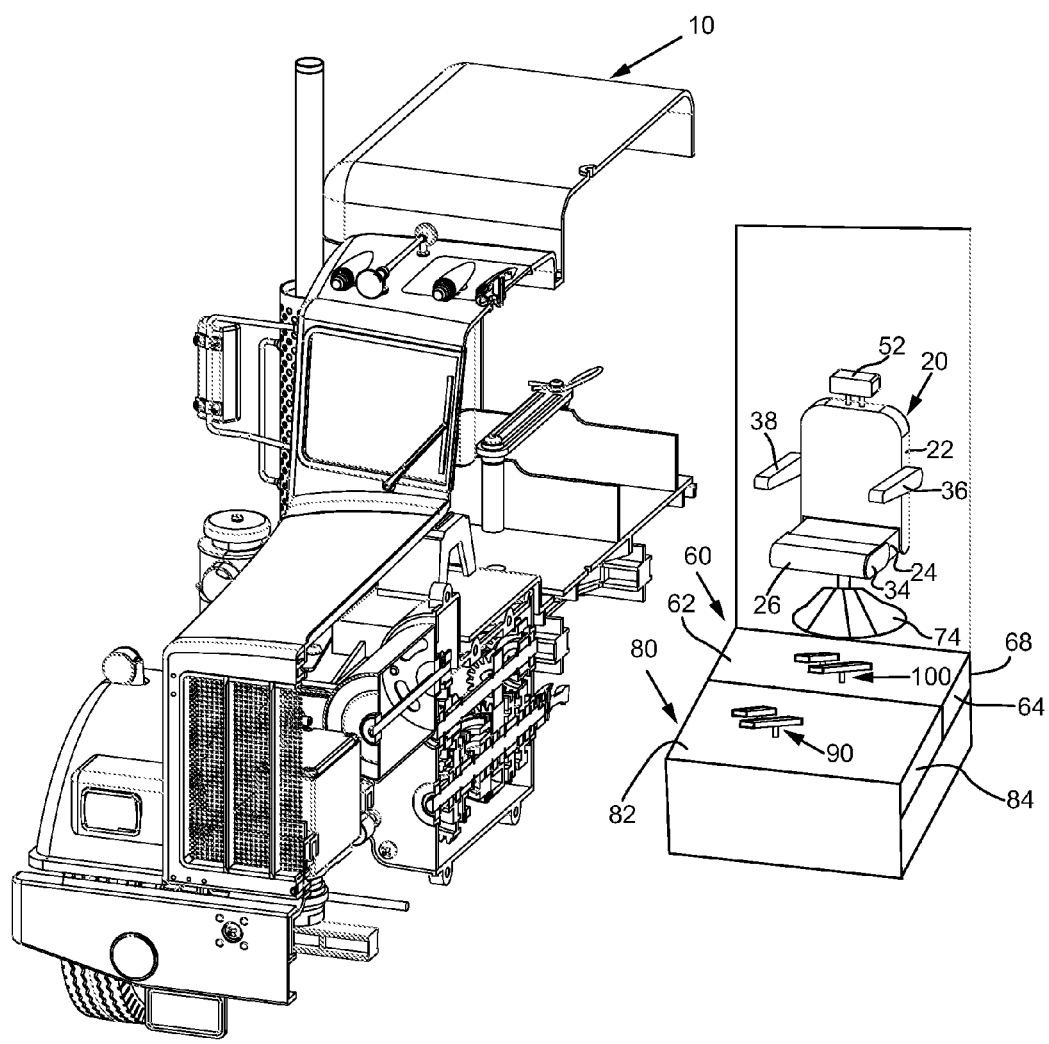
FIG. 5 is a perspective view of the adjustable seat, the two sets of gas and brake pedals, the adjustable floor pan and the truck floor.
Figure 6:
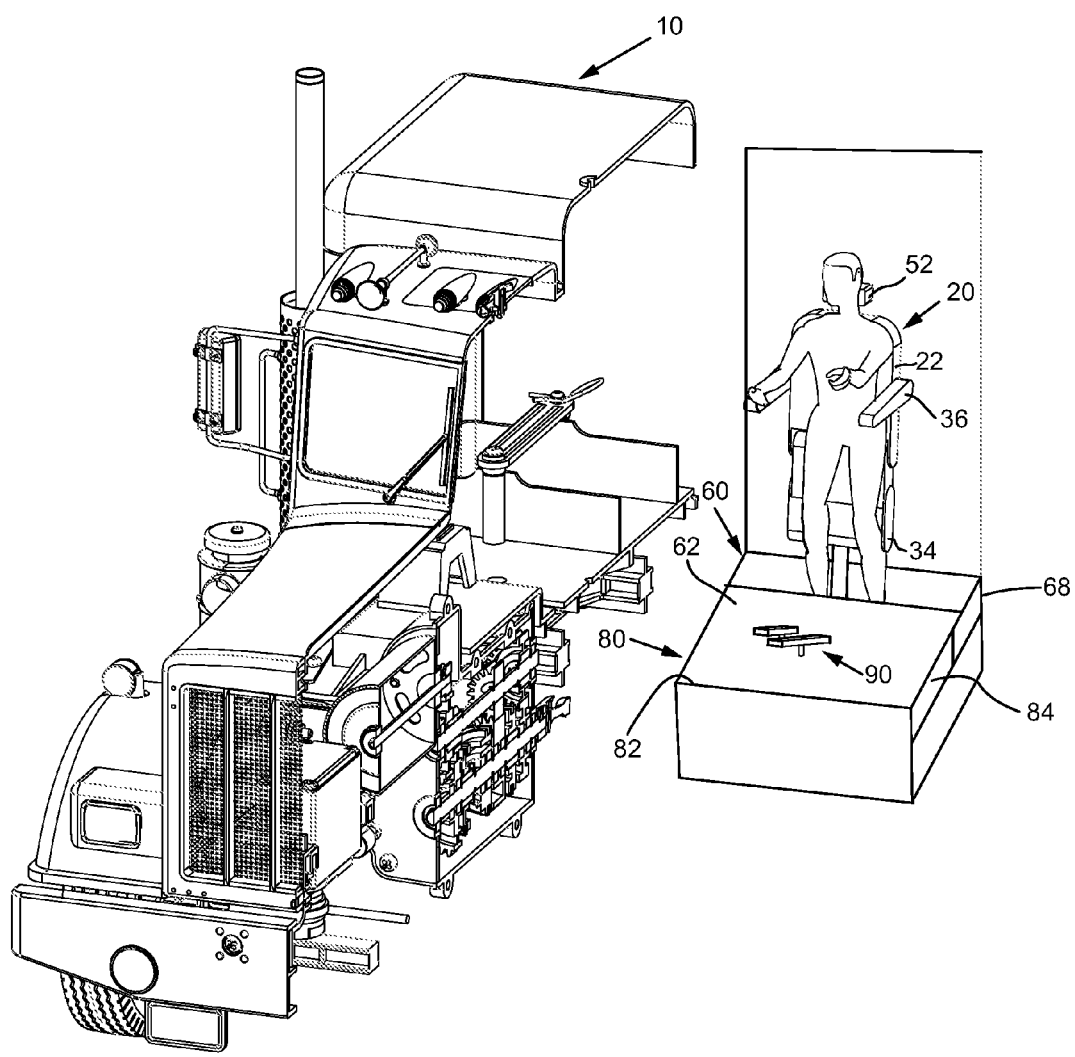
FIG. 6 is a cut away view showing a driver in the standing position and using the first set of gas and brake pedals.
Figure 7:
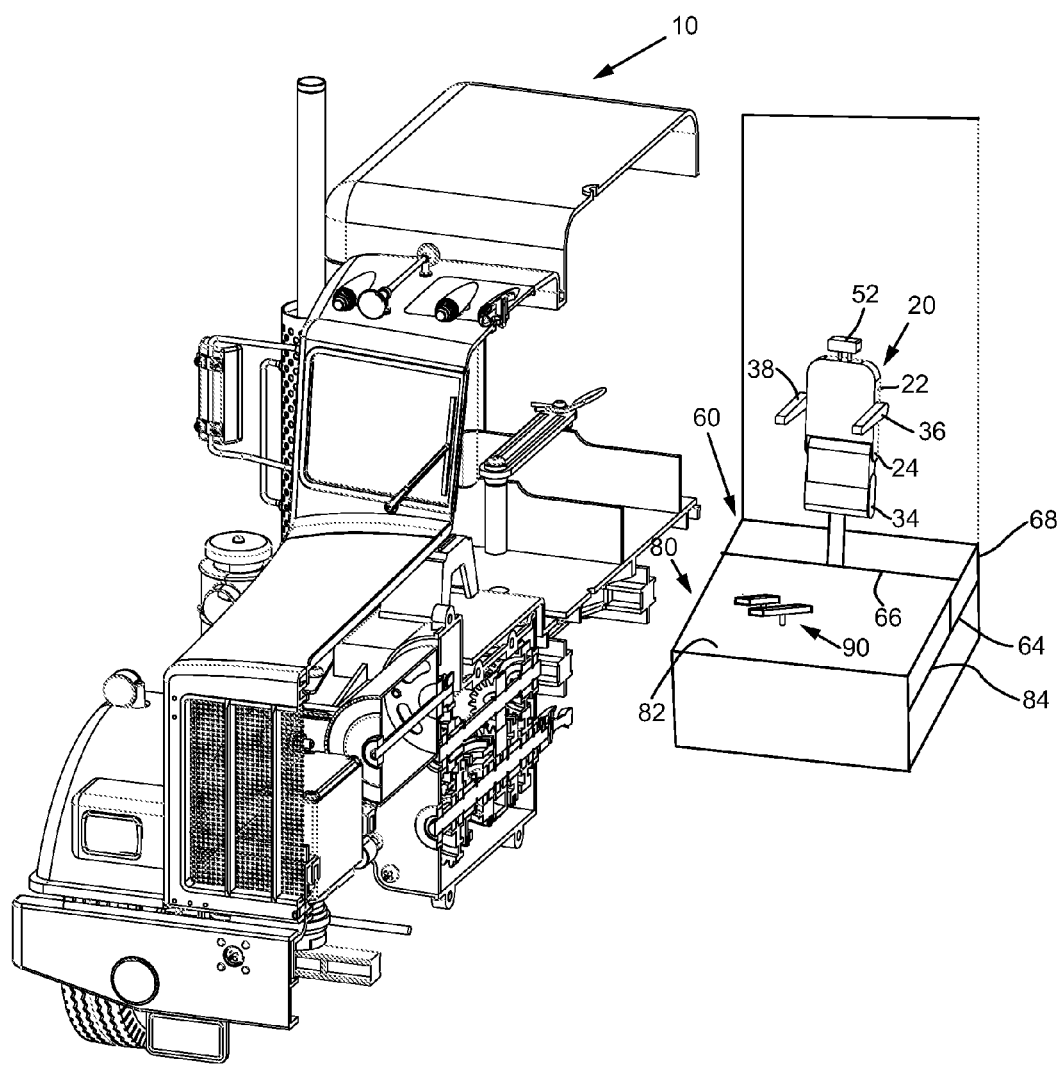
FIG. 7 is a cut away view showing the adjustable seat being pushed back into the standing position and the adjustable floor pan being lowered.
Figure 8:
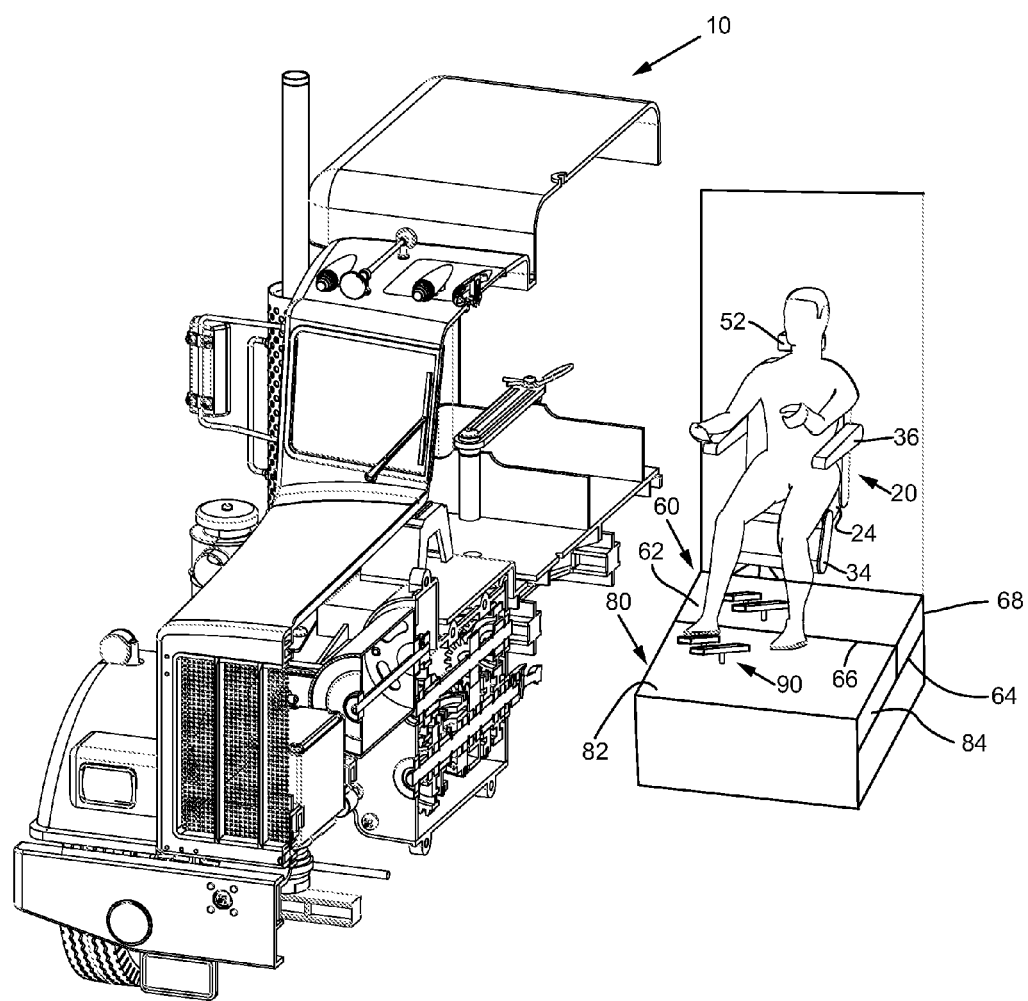
FIG. 8 is a cut away view showing a driver in the squatting position and using the first set of gas and brake pedals.
Figure 9:
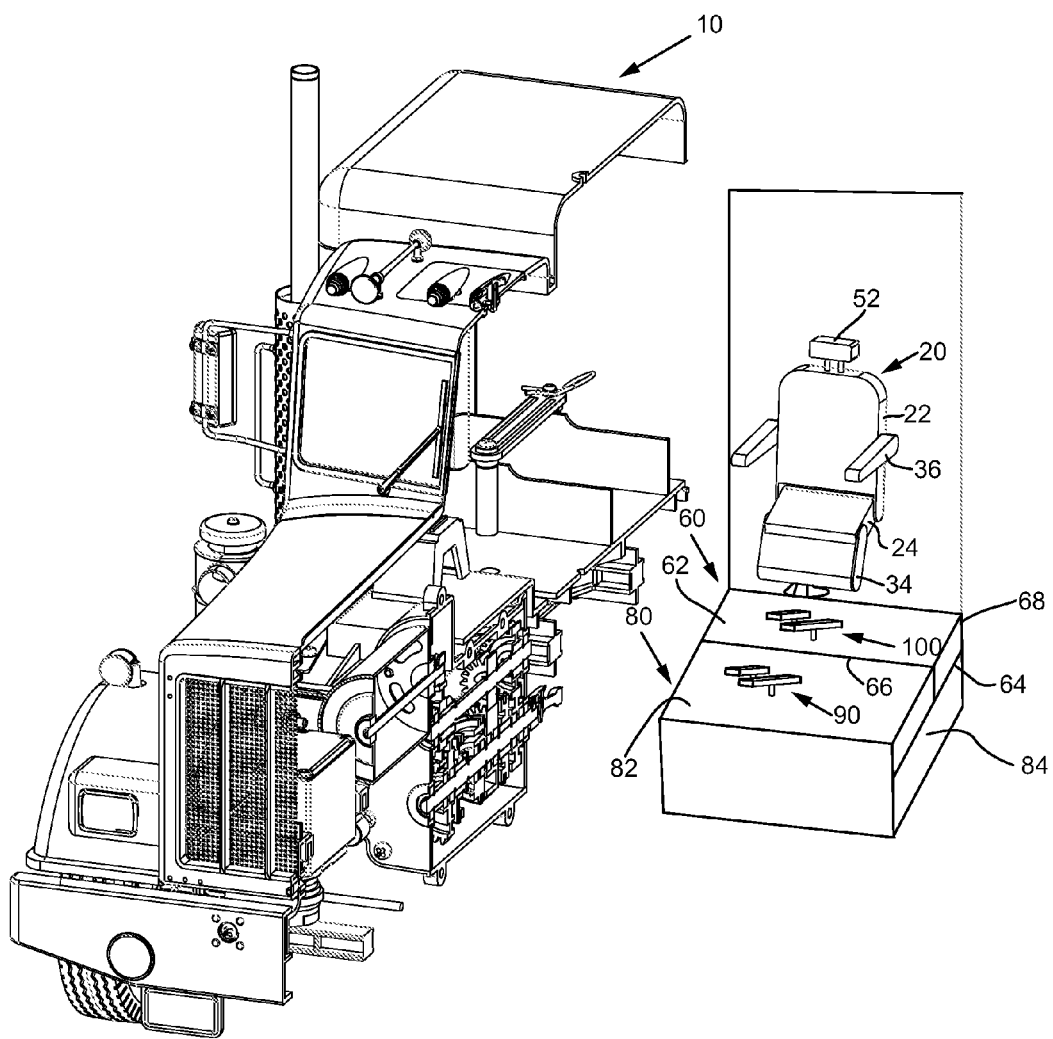
FIG. 9 is a cut away view showing the two sets of gas and brake pedals and the adjustable seat being pushed back into the squatting position.
Figure 10:
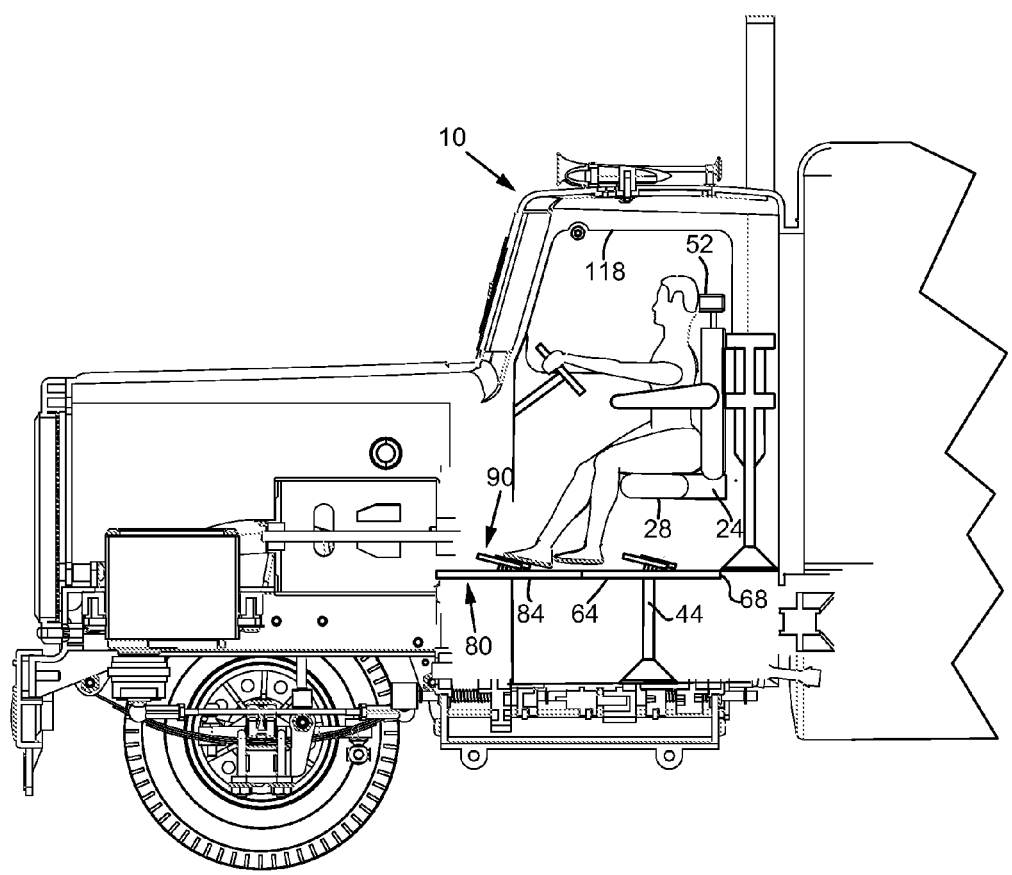
FIG. 10 is a side perspective view showing the driver in the sitting position and the driver using the first set of gas and brake pedals.
Figure 11:
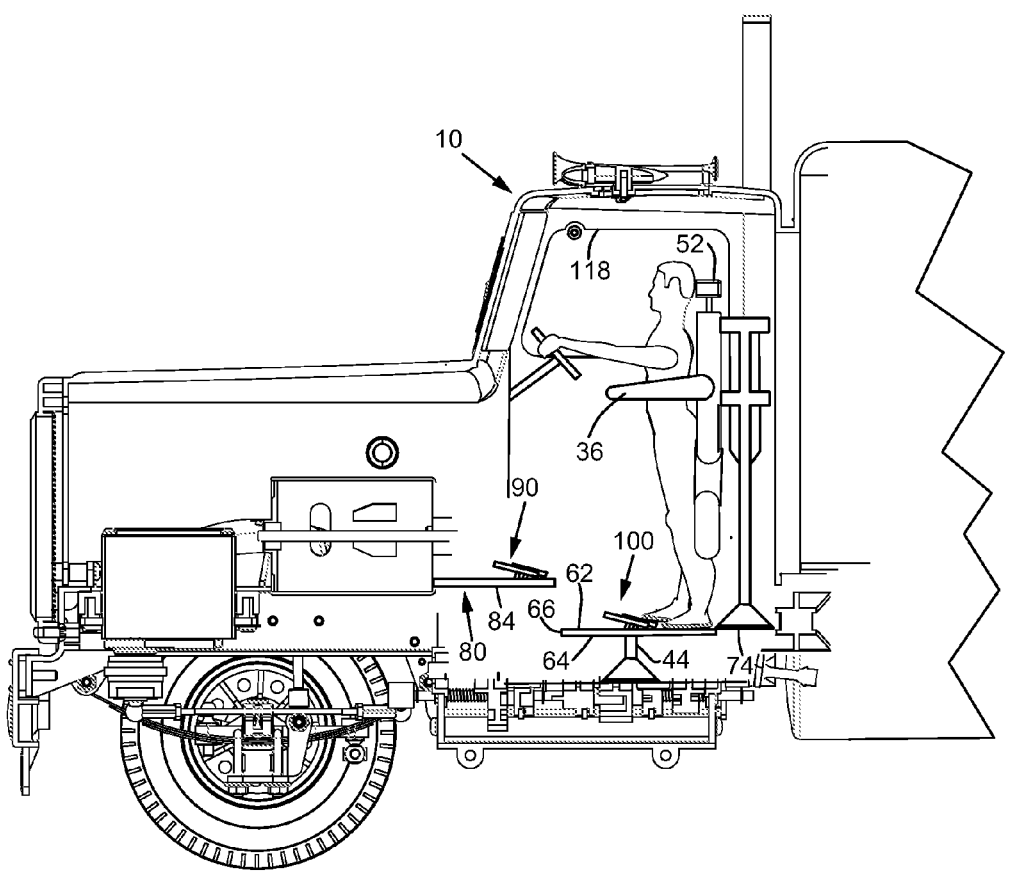
FIG. 11 is a side perspective view showing the driver in the standing position, the adjustable floor pan being lowered and the driver using the second set of gas and brake pedals.
Figure 12:
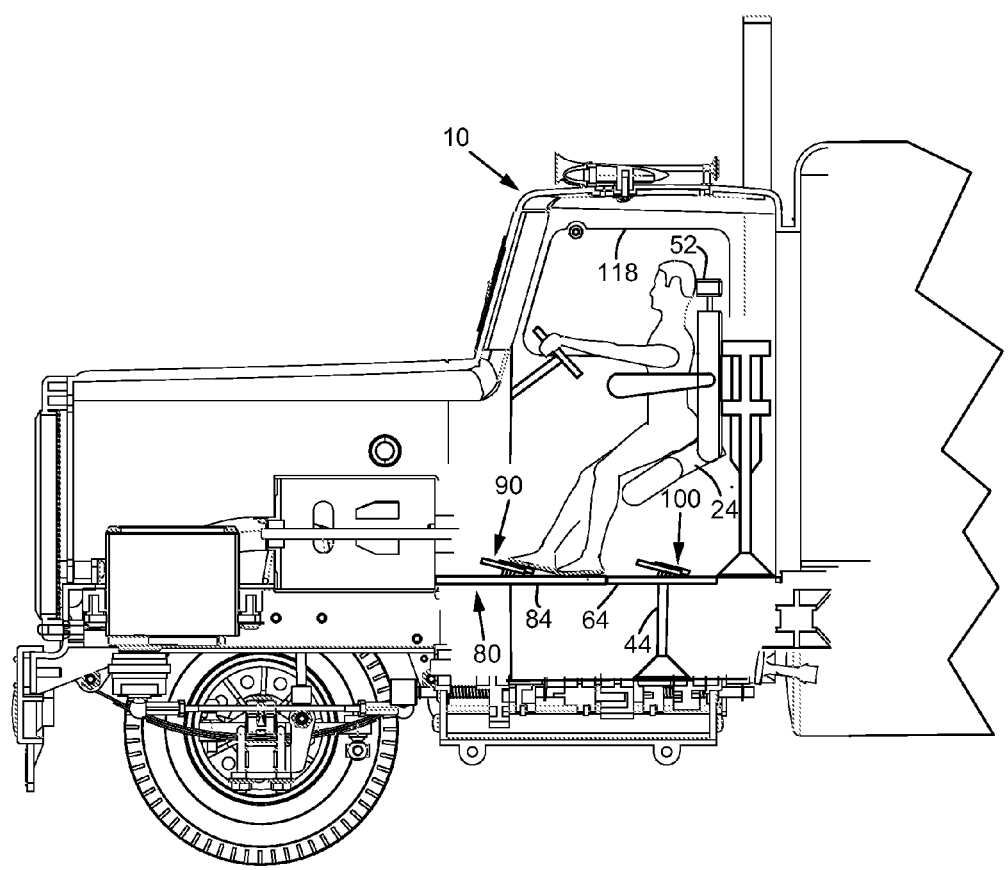
FIG. 12 is a side perspective view showing the adjustable seat in the squatting position, the adjustable floor pan being lowered and the driver using the first set of gas and brake pedals.
Figure 13:
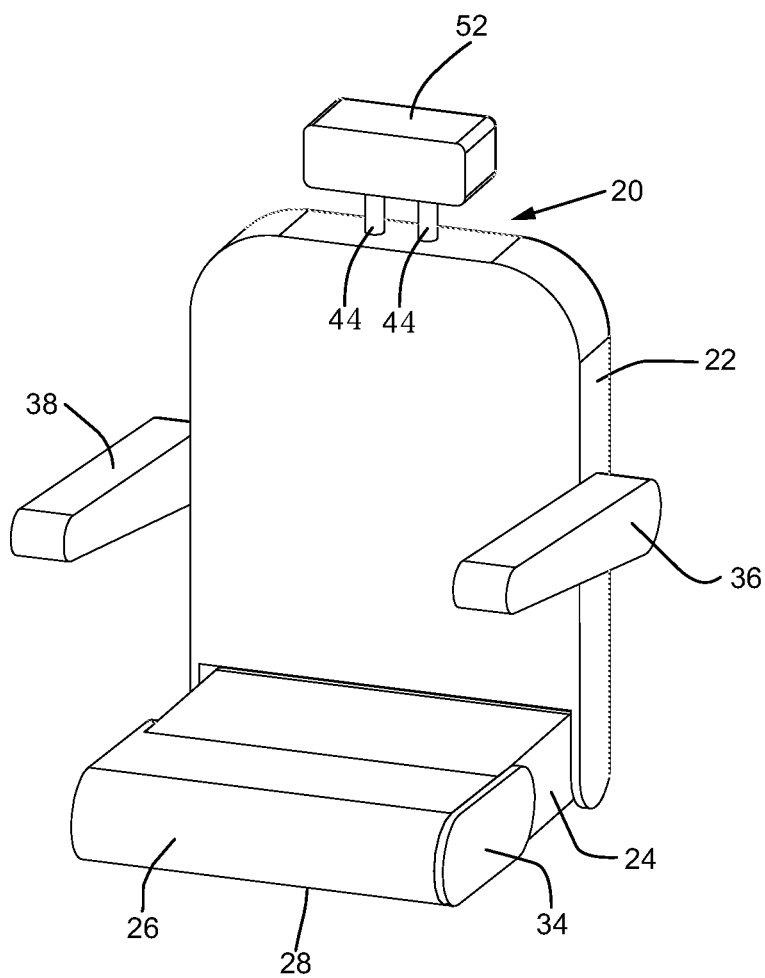
FIG. 13 is an exploded view of the adjustable seat in the sitting position, the adjustable headrest, the left side armrest and the right side armrest.
Figure 14:
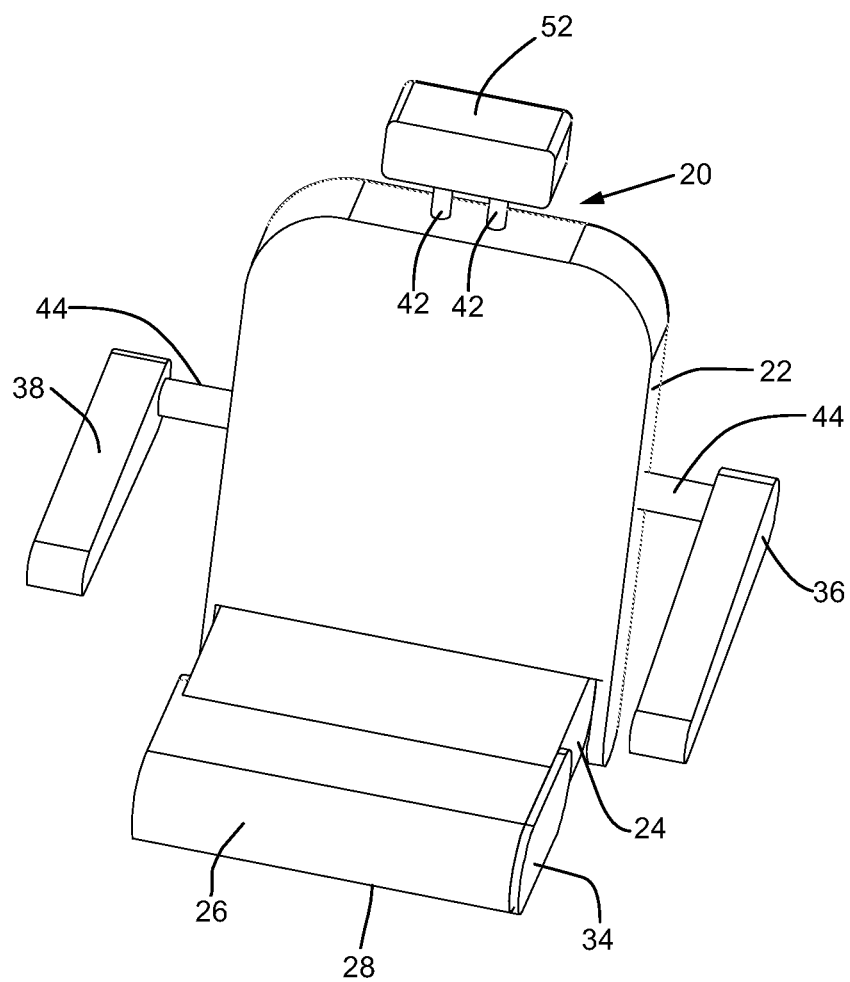
FIG. 14 is an exploded view of the adjustable seat in the sitting position and the adjustable headrest and the adjustable armrests being extended away from the adjustable seat.
Figure 15:
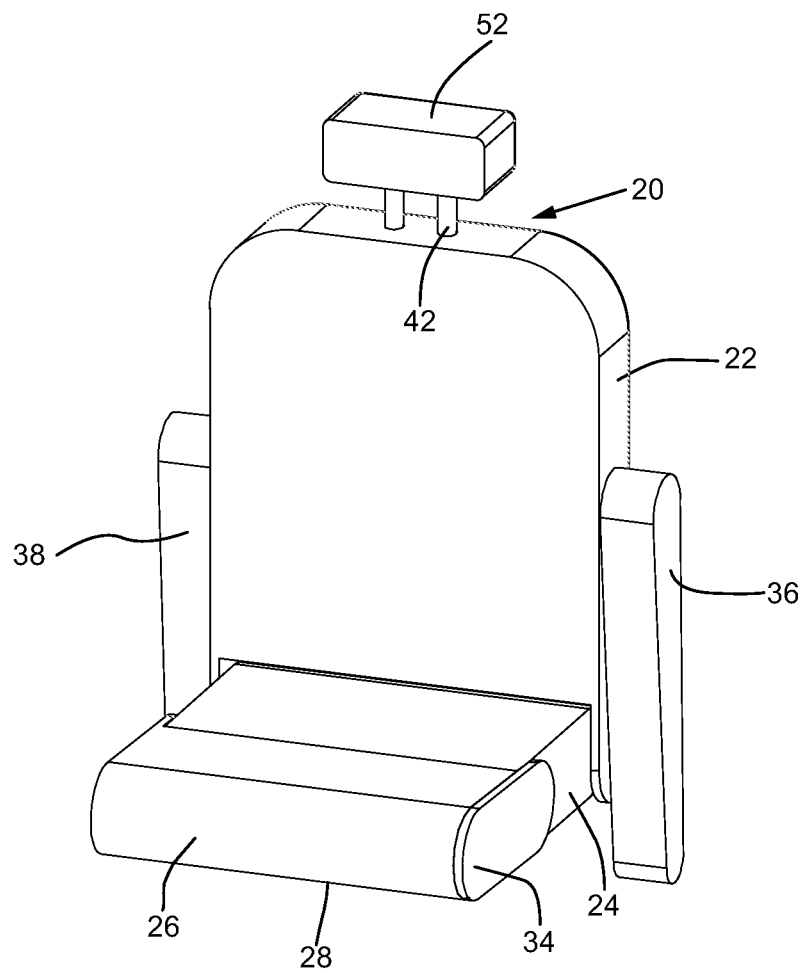
FIG. 15 is an exploded view of the adjustable seat in the sitting position, the adjustable headrest and the adjustable armrests being extended in a downward position.
Figure 16:
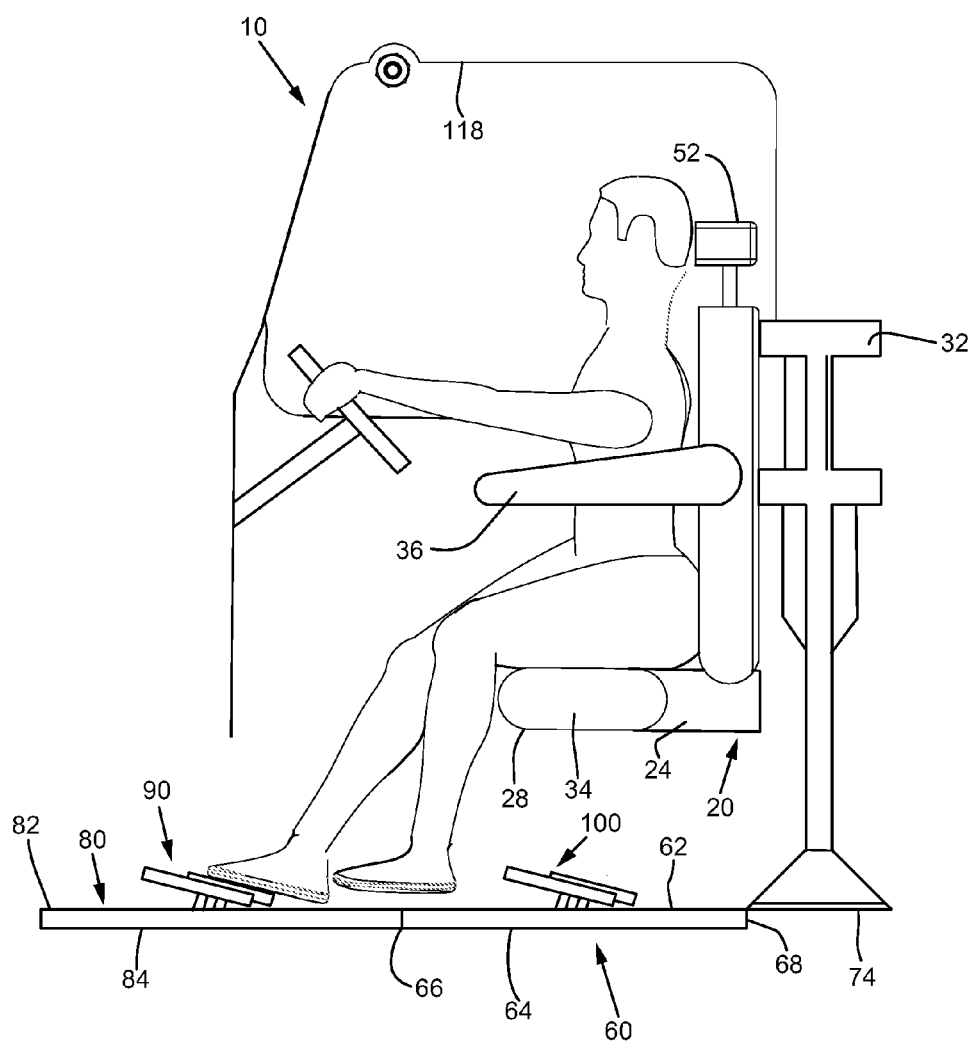
FIG. 16 is an exploded view of the adjustable seat in the sitting position and the driver using the first set of gas and brake pedals.
Figure 17:
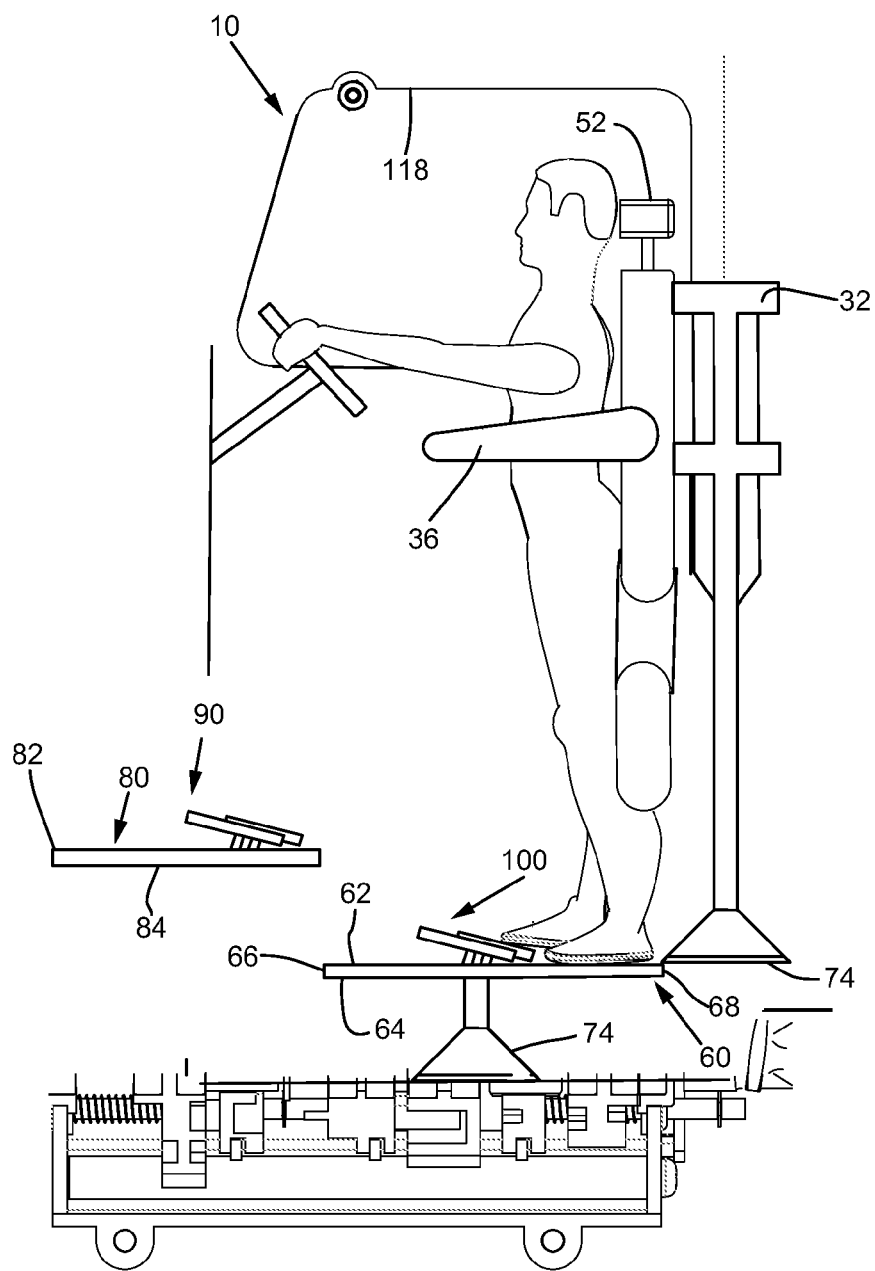
FIG. 17 is an exploded view of the adjustable seat in the standing position, the adjustable floor pan being lowered and the driver using the second set of gas and brake pedals.
Figure 18:
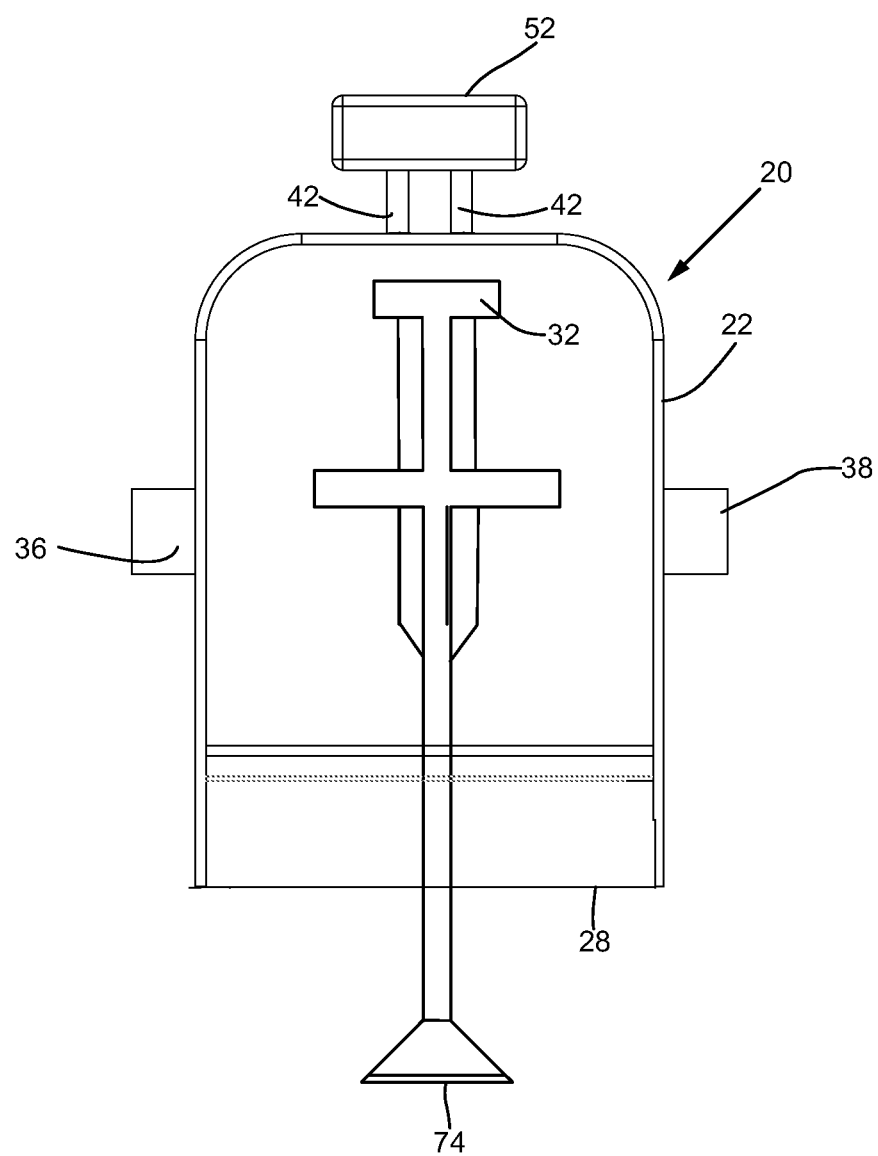
FIG. 18 is an exploded view of the adjustable seat in the sitting position, the large adjustable pipes being used to adjust the seat in a vertical or horizontal direction and the location of the air cylinder system being used to adjust the seat.
Figure 19:
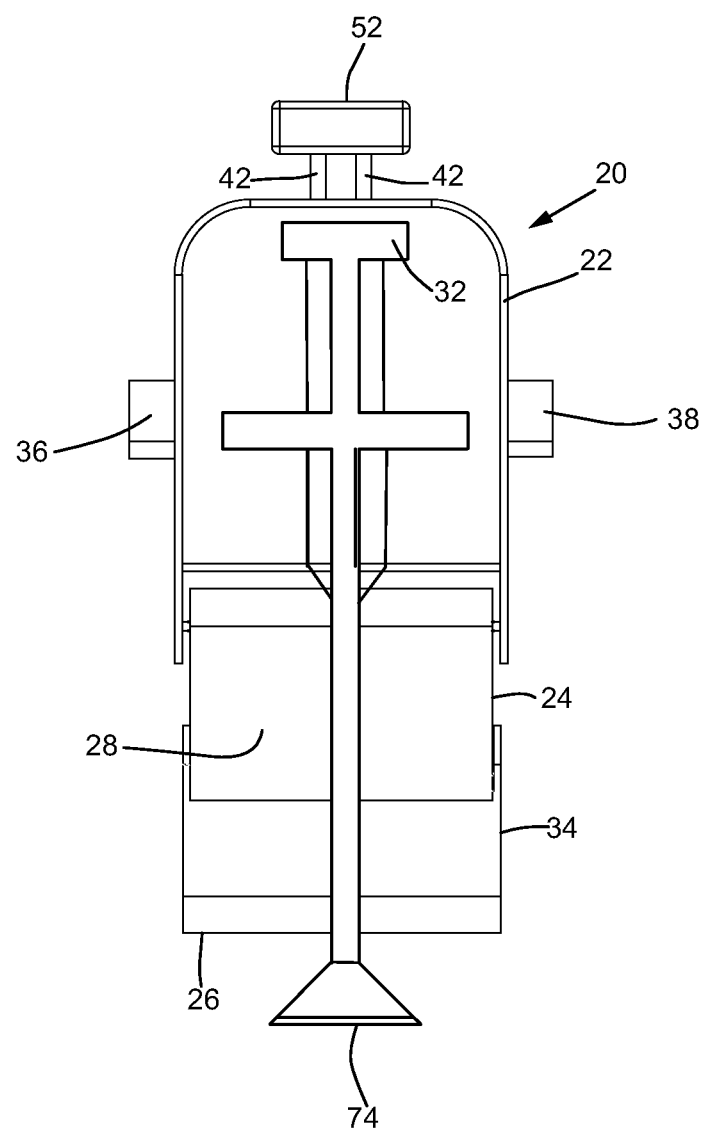
FIG. 19 is an exploded view of the adjustable seat in the standing position, the large adjustable pipes being used to adjust the seat in a vertical or horizontal direction and the location of the air cylinder system being used to adjust the seat.

Turning now to FIGS. 1-19 of the attached drawings, a tractor truck 10 operator area embodying the present invention is illustrated, the tractor truck 10 being generally designated by the numeral 10. The tractor truck 10 has an operator control area suited for driving at extended periods of time by a driver. The operator control area comprising an adjustable seat 20, an adjustable floor pan 60, a truck floor 80, a first set of gas and brake pedals 90, a second set of gas and brake pedals 100 and a double door assembly 110. The adjustable seat 20 comprising a seat back 22, a seat cushion having a back portion 24 and a front portion 26, a headrest 52, a left side arm rest 36 and a right side arm rest 38 for convenience when the truck is being driven. The entire adjustable seat 20 incorporating the seat back 22, the back portion 24 of the seat cushion and front portion 26 of the seat cushion can be adjusted upwards and downwards.

The plurality of channel-like guide pipes 32 extend along the rear of the seat back 22 and support the adjustable seat 20 in a vertical or horizontal direction. The channel-like pipes 32 allow movement of the adjustable seat 20 in a backward or forward direction. An air cylinder 74 provides the force necessary to adjust the seat 20 in an upward or downward direction. At least one air cylinder 74 extends between the back portion of the seat cushion 24 and the adjustable floor pan 60.

The front portion of the seat cushion 26 can be tilted up or down and is supported by a lever mechanism 34 to raise or lower the front portion 26. The lever being mounted on the sides of the back portion 24 and right portion 26 of the seat cushion. The adjustable seat 20 being movable by an air cylinder 74 which can be mounted to the bottom surface 28 of the back portion of the seat cushion 24.

The headrest 52 which is housed on the top portion of the adjustable seat 20 is mounted on small guide pipes 44 that extend from the body of said adjustable seat 20 in the ascending and descending direction. A left side arm rest 36 and a right side arm rest 38 can be mounted on the left and right sides of the adjustable seat 20 by large guide pipes 42. The left side arm rest 36 and the right side arm rest 38 can be adjusted to various angles and can be extended away from the adjustable seat 20. The headrest 52 along with the left side arm rest 36 and right side arm rest 38 can be electrically and mechanically coupled to the adjustable seat 20.

The adjustable floor pan 60 has a top surface 62, a bottom surface 64, a front edge 66 and a rear edge 68 and is directly supported at the bottom surface 64 by a small guide pipe 44 which projects downwards. The small guide pipe 44 is connected to an air cylinder 74 which provides the directional force to move the adjustable floor pan 60 in an upward or downward direction. The adjustable floor pan 60 is adapted to sustain a person while sitting, standing or squatting and can be configured to be suitable for use by vehicle operators. The adjustable floor pan 60 has selective upward and downward adjustments while the driver is in the standing position and allow the driver to select a suitable driving height.

The truck floor 80 is contiguous with the adjustable floor pan 60 and is built at the same horizontal level. The truck floor 80 houses the first set of gas and brake pedals 90 when the driver is in a sitting or squatting position. The truck floor 80 can be hinged to the interior of the tractor truck 10 and can be moved in a ninety degree angle. The first set of gas pedals 90 and the second set of gas pedals 100 have a common mount are capable of backwards and forwards movements depending on the driver's preference.

The double door assembly 110 has a door frame opening 118, a top door 114 and a bottom door 116. A plurality of single-axis hinges 126 are used to connect the double door assembly 110 to the tractor truck body 122. The top door 114 and the bottom door 116 open and close on a horizontal plane.

The top door 114 can have bottom extensions 132 extending along the bottom of the top door 114 which can engage the bottom door extensions 142 extending along the top rim of the bottom door 116. The extensions 132 and 142 can be used for convenience and to assist in making a weather-proof double door assembly 110. The top door 114 has a top latch mechanism 128 for operating the top door 114 from the inside or the outside of the tractor truck 10. The door frame opening 118 of the top door 114 is capable of housing a movable window 134.

The bottom door 116 can have a top step 146 and a bottom step 148 being attached to the outer surface the said bottom door 116. The top step 146 and the bottom step 148 can have a top step surface 152 and a bottom step surface 154 respectively. The top 146 and the bottom step 148 being adapted to be secured to the outer surface of the bottom door 116 and being adapted for swinging movements inward and outward therefrom.

The double door assembly 110 of the present invention is adequately dimensioned and configured to close the door frame opening 118 of the tractor truck 10 and to allow the driver to enter and exit the tractor truck 10. Once the bottom door 116 is opened, a space for stepping in and stepping out of the tractor truck 10 is formed to accommodate the use of the tractor truck 10 in the standing position.

The adjustable floor pan 60, channel-like guide pipes 32, small guide pipes 44 and large guide pipes 42 pan can be constructed from a metal material.

What is claimed is:

1. A tractor truck operator control area for a tractor truck suited for driving at extended periods of time by a driver, said operator control area comprising:

a. An adjustable seat, an adjustable floor pan, a truck floor, a first set of gas and brake pedals, a second set of gas and brake pedals and a double door assembly;

b. Said adjustable seat in said operator control area comprising a seat back, seat cushion, headrest, a left side arm rest and a right side arm rest for convenience when the truck is being driven, said seat back being connected to said cushion at a central axis of said seat cushion such that the angle between said seat back and said seat cushion adapted to be selectively adjustable, said seat back having a plurality of spaced apart pipes extending along the rear of said seat back for supporting and engaging said adjustable seat in a vertical or horizontal direction, said adjustable seat having said pipes for allowing movement of said adjustable seat in a backward or forward direction, said adjustable seat being adjustable in an upward or downward direction by an air cylinder system which extends between said bottom surface of said seat cushion and said adjustable floor pan, said seat cushion being movable backwards into a standing position and forwards into a sitting position, said seat cushion having a back portion and a front portion, said seat cushion being adjustable about a horizontal axis from a first orientation in a sitting position for said vehicle operator to a standing position facing laterally toward the front of said tractor truck, said seat cushion being a tilt adjustable cushion, said front portion adapted to be tilted up or down and supported by a lever mechanism to raise or lower said front portion, said lever being mounted on the side of said seat cushion, said lever mechanism adapted to include a seat retention mechanism to retain said front portion or said back portion in the upper or lower position, said adjustable seat being configured to be suitable for use by vehicle operators; said headrest being mounted to the top portion of said adjustable seat and said headrest being adjustable by small guide pipes that extend from the body of said adjustable seat in the ascending and descending direction, said headrest adapted to be electrically and mechanically coupled to said adjustable seat; said armrests adapted to be mounted to the left and right sides of said adjustable seat by large guide pipes and extend from the sides of said adjustable seat, said armrests being adapted to adjust to various angles, said armrests adapted to be extended away from said adjustable seat, said armrests adapted to be electrically and mechanically coupled to said adjustable seat;

c. Said adjustable floor pan having a top surface, a bottom surface, a front edge and a rear edge, said adjustable floor pan being directly supported at said bottom surface by an elongated guide pipe which projects downwards, said elongated guide pipe being connected to an air cylinder which provides the directional force to move said adjustable floor pan in an upward or downward direction, said adjustable floor pan adapted to have a shock absorption system to prevent the heels of said vehicle operator from absorbing the shocks and maintain control of the vehicle, said adjustable floor pan being adapted to sustain a person while sitting, standing or squatting, said shock absorption system being located in said air cylinder beneath said adjustable floor pan, said adjustable floor pan being adjustable to a stable position, said adjustable floor pan being usable in the sitting, standing or squatting positions, said adjustable floor pan being configured to be suitable for use by vehicle operators, said adjustable floor pan having a selective upward and downward adjustment while said vehicle operator is in the standing position and to allow selective placement of said adjustable floor pan by said vehicle operator;

d. Said truck floor being contiguous with said adjustable floor pan and built at the same horizontal level, said truck floor housing said first set of gas and brake pedals when said driver is in a sitting or squatting position, said truck floor being hinged to the interior or said truck operator control area and being moveable in a ninety degree angle;

e. Said first set of gas and brake pedals having a common mount, said first set of gas and brake pedals being adapted for selective adjustment backwards and forwards depending on the driver's preference;

f. Said second set of gas and brake pedal having a common mount, said second set of gas and brake pedals being adapted for selective adjustment backwards and forwards depending on the driver's preference;

g. Said first set of gas and brake pedals and said second set of gas and brake pedals being adapted to enable a driver to operate the tractor truck while sitting, standing or squatting;

h. Said double door assembly having a door frame opening, a top door and a bottom door, said top door defining a top door outer surface and being pivotally connected with respect to a body of the tractor truck and being movable between open and closed positions on a horizontal plane, said bottom door being suspended from the tractor truck body using a plurality of conventional single-axis hinges, said top door adapted to have top door extensions beyond its bottom edge for convenience and to assist in making a weather tight door, said top door having a top latch mechanism for operating said top door from the inside or the outside of said tractor truck, said top door having a window frame and being able to house a movable window in said window frame; said bottom door defining a bottom door outer surface and being pivotally connected with respect to the truck tractor body and being movable between open and closed positions, said bottom door being suspended from the automobile body using said single-axis hinges, said bottom door adapted to have top extensions beyond its top edge for convenience and to assist in making a weather tight door, said bottom door having a bottom latch mechanism for operating said bottom door from the inside or the outside of said tractor truck, said bottom door adapted to have a top step and a bottom step, said top step and said bottom step being attached to the outer surface of said bottom door, said top step and said bottom step having a top step surface and a bottom step surface respectively and being adapted to be secured to said outer surface of said bottom door and being adapted for swinging movements inward and outward therefrom, said top step and said bottom step being arranged on a lower portion of a front face of said bottom door.

2. The tractor truck operator control area of claim 1 wherein said tractor truck operator control area is adapted to be used in any type of vehicle.

3. The tractor truck operator control area of claim 1 wherein said adjustable seat of said tractor truck operator area is adapted to have means for releasably locking said adjustable seat into various horizontally or vertically adjusted positions into which it is moved relative to said shock absorption system.

4. The tractor truck operator control area of claim 1 wherein said adjustable floor pan of said tractor truck operator area is adapted to have means for releasably locking said adjustable floor pan in various horizontally or vertically adjusted positions into which it is moved relative to shock absorption system.

5. The tractor truck operator control area of claim 1 wherein said double door assembly is an outwardly swinging door.

6. The tractor truck operator control area of claim 1 wherein said double door assembly is adequately dimensioned and configured to close the opening of said tractor truck.

7. The tractor truck operator control area of claim 1 wherein said adjustable floor pan is adapted to be constructed from a metal material.

8. The tractor truck operator control area of claim 1 wherein said large guide pipes are adapted to be constructed from a metal material.

9. The tractor truck operator control area of claim 1 wherein said small guide pipes are adapted to be constructed from a metal material.

* * * * *